US009457572B2

(12) United States Patent
Yamada et al.

(10) Patent No.: US 9,457,572 B2
(45) Date of Patent: Oct. 4, 2016

(54) INKJET HEAD AND METHOD FOR PRODUCING INKJET HEAD

(75) Inventors: Akihisa Yamada, Tokyo (JP); Tadashi Hirano, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 6 days.

(21) Appl. No.: 13/883,737

(22) PCT Filed: Oct. 25, 2011

(86) PCT No.: PCT/JP2011/074579
§ 371 (c)(1),
(2), (4) Date: May 6, 2013

(87) PCT Pub. No.: WO2012/063641
PCT Pub. Date: May 18, 2012

(65) Prior Publication Data
US 2013/0229462 A1    Sep. 5, 2013

(30) Foreign Application Priority Data
Nov. 8, 2010   (JP) ................... 2010-249472

(51) Int. Cl.
*B41J 2/16* (2006.01)
*B41J 2/14* (2006.01)
*C08G 59/40* (2006.01)
(Continued)

(52) U.S. Cl.
CPC ............ *B41J 2/162* (2013.01); *B41J 2/14024* (2013.01); *B41J 2/1433* (2013.01); *B41J 2/14209* (2013.01); *B41J 2/1603* (2013.01); *B41J 2/1609* (2013.01); *B41J 2/1623* (2013.01);
(Continued)

(58) Field of Classification Search
CPC ...... B41J 2/1606; B41J 2/162; B41J 2/1621; B41J 2/1623
USPC ..................... 29/890.01; 347/40–49
See application file for complete search history.

(56) References Cited

U.S. PATENT DOCUMENTS 6,481,828 B2 *  11/2002  Baek et al. .................. 347/48
6,527,377 B1 *   3/2003  Ikegame et al. ............. 347/56
(Continued)

FOREIGN PATENT DOCUMENTS

EP   1923219 A2   5/2008
JP   2000-334954 A  12/2000
(Continued)

OTHER PUBLICATIONS

Takeshi et al. (JP 2005-138529) machine translation.*
(Continued)

*Primary Examiner* — An Do
*Assistant Examiner* — Renee I Wilson
(74) *Attorney, Agent, or Firm* — Holtz, Holtz & Volek PC

(57) ABSTRACT

An inkjet head and a production method wherein the inkjet head is produced by forming a film on a head chip having a channel member with an ink channel formed thereon and joining an end surface of the head chip coated with the film to a nozzle plate. The method includes a step of applying an adhesive containing spherical particles, whose volume average particle diameter is in the range of 0.95*Rz (MV) to 2.0*Rz (MV), in the range of 0.1 volume % to 10.0 volume % to at least one of the end surface of the head chip and a joint surface of the nozzle plate and then joining the nozzle plate.

20 Claims, 3 Drawing Sheets

(51) Int. Cl.
*C08G 59/72* (2006.01)
*C09J 163/00* (2006.01)

(52) U.S. Cl.
CPC ........... *C08G59/4042* (2013.01); *C08G 59/72* (2013.01); *C09J 163/00* (2013.01)

(56) References Cited

U.S. PATENT DOCUMENTS

| | | |
|---|---|---|
| 6,619,785 B1 | 9/2003 | Sato |
| 6,659,588 B2* | 12/2003 | Ikegame et al. ................ 347/40 |
| 7,360,867 B2* | 4/2008 | Nomori et al. ................ 347/40 |
| 2003/0057538 A1 | 3/2003 | Watson |
| 2006/0055742 A1 | 3/2006 | Yokouchi |
| 2006/0207720 A1* | 9/2006 | Yoshizawa ......... C08G 59/3218 156/325 |
| 2007/0090299 A1 | 4/2007 | Kozakai et al. |
| 2008/0117263 A1 | 5/2008 | Watanabe |
| 2009/0214856 A1 | 8/2009 | Gomi |
| 2010/0245475 A1* | 9/2010 | Masashi et al. ................ 347/45 |

FOREIGN PATENT DOCUMENTS

| | | |
|---|---|---|
| JP | 2005-138529 A | 6/2005 |
| JP | 2006-051640 A | 2/2006 |
| JP | 2007-076009 A | 3/2007 |
| JP | 2007-138149 A | 6/2007 |

OTHER PUBLICATIONS

Extended European Search Report (in English) dated Mar. 21, 2014 in counterpart European Application No. 11840264.3.
International Search Report (ISR) dated Nov. 29, 2011 (and English translation thereof) issued in parent International Application No. PCT/JP2011/074579.

* cited by examiner

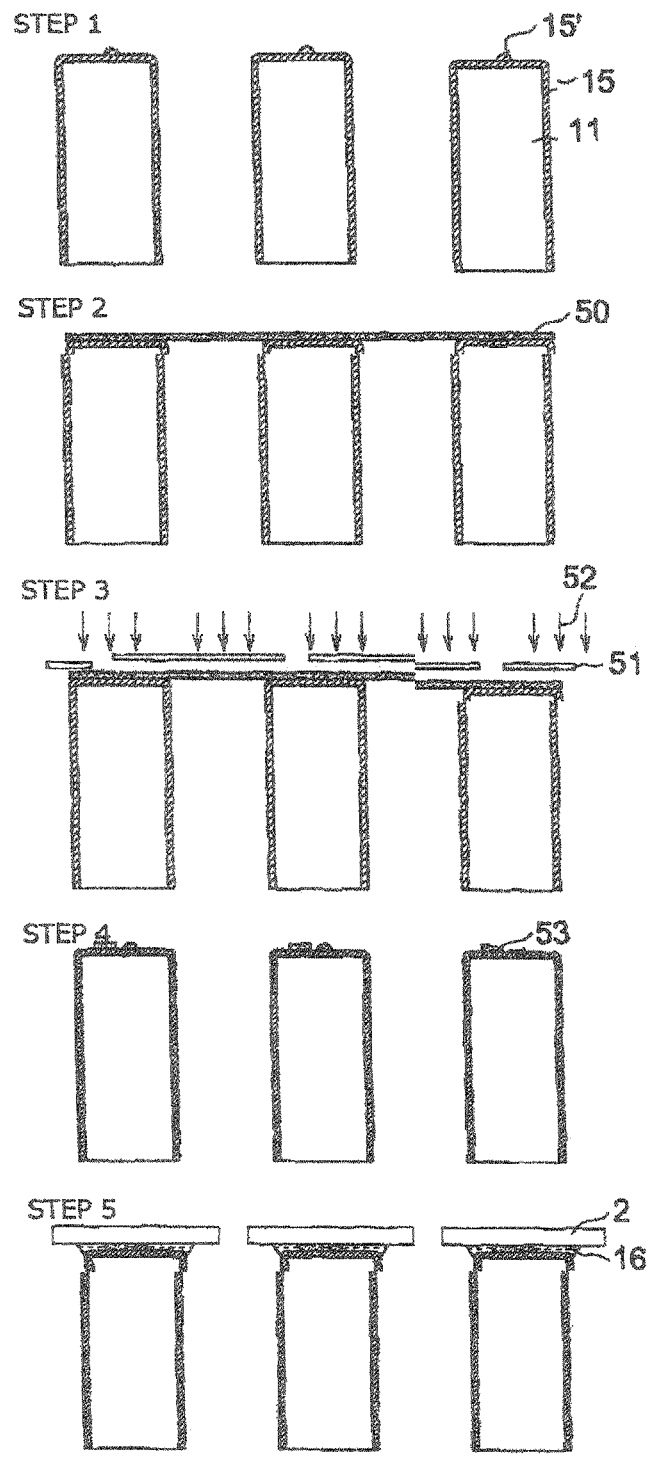

INKJET HEAD AND METHOD FOR PRODUCING INKJET HEAD

TECHNICAL FIELD

The present invention relates to an inkjet head and a method for producing an inkjet head, and more particularly to an inkjet head having a nozzle plate bonded thereto through an improved adhesive and a method for producing an inkjet head.

BACKGROUND

As typical ink discharge systems, there are a method for allowing a current to flow through an electric resistor arranged in a pressurizing chamber, vaporizing and expanding water in an ink through generated heat, applying a pressure to the ink, and discharging the ink and a method for forming part of a channel member constituting the pressurizing chamber as piezoelectric bodies or installing the piezoelectric bodies on the channel member, selectively driving the piezoelectric bodies associated with a plurality of nozzles, thereby deforming the pressurizing chamber based on dynamic pressures of the respective piezoelectric bodies, and then discharging a liquid from the nozzles.

In recent years, applications of inkjet to industrial purposes have expanded, and not only waterborne inks but also various kinds of inks such as a solvent ink or a UV cure ink have been used. The method for deforming a pressurizing chamber based on a dynamic pressure of each piezoelectric body and discharging an ink is superior in compatibility with the various kinds of inks, and it has been used in many fields.

On the other hand, in recent years, to realize density growth, an interval between neighboring nozzles is becoming narrower in an inkjet head. In an inkjet head having a configuration that partition walls having piezoelectric bodies are installed on a channel member and the partition walls and pressurizing chambers are alternately aligned, for example, an interval between nozzles with nozzle density of 180 dpi (dpi in the present invention represents the number of dots per 2.54 cm) is 140 μm. In this case, if the partition wall of 70 μm is present in the interval of 140 μm, a width of an ink channel is 70 μm. Assuming that nozzles have a shape that spreads from an outer surface toward an ink channel side along a nozzle plate thickness direction and a diameter on the ink channel side is 40 μm, a length from an end portion of the partition wall to the nozzle is only 15 μm. At the time of bonding the nozzle plate to, e.g., a recording element substrate or the channel member, when a heating treatment for hardening the adhesive is carried out, since viscosity of the adhesive is lowered due to this heating operation and the adhesive tends to flow, the adhesive flows into nozzle portions that are close to each other, and part of the nozzle portions or, in the worst case, the entire nozzle portions may be eventually closed. Especially, when an ink to be adopted has characteristics that swell or dissolve the adhesive, ink resisting properties of the adhesive must be enhanced. Therefore, although it is effective to select an adhesive whose glass-transition point increases after hardened, heat the adhesive at a high temperature at the time of hardening it, and raise the glass-transition point of the adhesive, viscosity of the adhesive before hardened is further lowered when the adhesive is heated to a high temperature, and the nozzle portions are more likely to be closed.

In view of preventing the adhesive from flowing into such a nozzle region, when an application amount of the adhesive is reduced, irregularities on a surface of the channel member or foreign particles adhering to this surface may produce a void where the adhesive is not present between the nozzle plate and the channel member, and the ink may leak through this void in some cases. On the other hand, when an adding amount of the adhesive is increased, an amount of the adhesive protruding from a gap between members increases, the adhesive flows into the nozzle region, and it is difficult to eliminate both the void and the flow into the nozzles.

As described above, according to the system that at least part of the channel member is formed of piezoelectric body and the piezoelectric body is deformed by an electrical signal to apply a pressure to the ink, an electrode configured to apply a voltage to the piezoelectric body is installed on the piezoelectric body surface. When the ink comes into contact with the electrode, since the electrode corrodes and comes down, a protective film is often provided on the electrode in order to protect it. The protective film can be formed by, e.g., heating and evaporating paraxylylene or its derivative in a vacuum chamber and polymerizing a radical, which has been generated by thermal decomposition, on the surface of the piezoelectric body having the electrode installed in the vacuum chamber. Since less pinholes are provided and the protective film can be formed to the inner side in a complicated structure, the protective film formed by this technique is often used.

However, the surface of the protective film formed by the above method has irregularities, and they may be an obstacle in subsequent processing. In particular, in case of bonding the nozzle plate to the surface of the protective film, besides the problem that the adhesive flows into the nozzles or a void is produced in the adhesive layer, there is also a problem that the nozzle plate is bonded in a curved state due to the irregularities, a discharge angle of droplets is thereby changed, and so-called bend occurs.

Patent Document 1 discloses that, to avoid the bend of discharge due to irregularities on a nozzle plate, many protrusions having the same height are provided on a joint surface of the nozzle plate for a head main body, and a thickness of an adhesive layer is uniformed when the nozzle plate is bonded to the head main body using the adhesive. However, the irregularities of the protective layer are disorganized, the protrusions may be formed on a convex portion of the protective film in the method according to Patent Document 1, and hence heights of the protrusions cannot be made constant. Further, provision of such protrusions requires many manufacturing steps, which is not preferable in terms of production efficiency.

On the other hand, Patent Document 2 discloses a method for producing an inkjet head by which an adhesive is applied to an upper surface of a protection layer having irregularities, the adhesive is hardened, a flattened layer is provided, the adhesive is further applied to the upper side of the flattened layer, and a nozzle plate is bonded. However, the process is complicated, and an effect for avoiding the bend of discharge provided by flattening is not sufficient.

PRIOR ART DOCUMENTS

Patent Documents

Patent Document 1: JP-A-2000-334954
Patent Document 2: JP-A-2007-76009

SUMMARY OF THE INVENTION

Problem to be Solved by the Invention

It is an object of the present invention to solve the above-described problem, to provide an inkjet head that can easily prevent an ejection defect due to a flow of an adhesive into nozzles or a void in an adhesive layer and does not cause ejection bend even though a joint surface of a head main body coated with a film such as a protective film has irregularities at the time of bonding a nozzle plate, and to also provide a producing method thereof.

Means for Solving Problem

The object of the present invention is solved by the following means.

1. A method for producing an inkjet head that is produced by forming a film on a head chip having a channel member with an ink channel formed thereon and jointing an end surface of the head chip coated with the film to a nozzle plate, the method comprising a step of applying an adhesive containing spherical particles, whose volume average particle diameter is in the range of 0.95×Rz (MV) to 2.0×Rz (MV), in the range of 0.1 volume % to 10.0 volume % to at least one of the end surface of the head chip and a joint surface of the nozzle plate and then jointing the nozzle plate, wherein Rz is one of surface roughness indexes specified by JIS B0601:2001 and is a maximum height of the end surface of the head chip coated with the film when a reference length of the surface jointed to the nozzle plate is 2.5 mm, and Rz (MV) is an average value of Rz obtained by measuring five positions.

2. The method for producing an inkjet head according to 1,
wherein the film contains polyparaxylylene or a polyparaxylylene derivative.

3. The method for producing an inkjet head according to 1 or 2,
wherein the film is formed by a vapor phase method.

4. The method for producing an inkjet head according to any one of 1 to 3,
wherein the film is a protective film.

5. The method for producing an inkjet head according to any one of 1 to 4,
wherein the adhesive is applied to the end surface of the head chip.

6. The method for producing an inkjet head according to any one of 1 to 5,
wherein the nozzle plate has a substrate made of silicon.

7. The method for producing an inkjet head according to any one of 1 to 6,
wherein the adhesive is an adhesive curable by ultraviolet rays.

8. The method for producing an inkjet head according to any one of 1 to 7,
wherein a coefficient of variation of a particle diameter of each spherical particle is not greater than 1.8%.

9. An inkjet head in which a head chip having a channel member with an ink channel formed thereon is coated with a film and an end surface of the head chip coated with the film is jointed to a nozzle plate through an adhesive, the adhesive containing spherical particles, whose volume average particle diameter is in the range of 0.95×Rz (MV) to 2.0×Rz (MV), in the range of 0.1 volume % to 10.0 volume %, wherein Rz is one of surface roughness indexes specified by JIS B0601:2001 and is a maximum height of the end surface of the head chip coated with the film when a reference length of the surface jointed to the nozzle plate is 2.5 mm, and Rz (MV) is an average value of Rz obtained by measuring five positions.

10. The inkjet head according to 9,
wherein the film contains polyparaxylylene or a polyparaxylylene derivative.

11. The inkjet head according to 9 or 10,
wherein the film is a protective film.

12. The inkjet head according to any one of 9 to 11,
wherein the nozzle plate has a substrate made of silicon.

13. The inkjet head according to any one of 9 to 12,
wherein the adhesive is an adhesive curable by ultraviolet rays.

14. The inkjet head according to any one of 9 to 13,
wherein a coefficient of variation of a particle diameter of the spherical particles is not greater than 1.8%.

Effect of the Invention

According to the present invention, it is possible to provide the inkjet head that can easily prevent an ejection defect due to a flow of the adhesive into the nozzles or a void in the adhesive layer and does not cause ejection bend even though the joint surface of the head main body coated with the film, e.g., the protective film has irregularities at the time of bonding the nozzle plate, and to also provide the producing method thereof.

BRIEF DESCRIPTION OF DRAWINGS

FIG. 5 is a view showing steps of providing protrusions on an end surface of a head chip by using a photoresist and then bonding the nozzle plate in a method for producing an inkjet head according to Comparative Example 9.

DESCRIPTION OF THE PREFERRED EMBODIMENTS

Although the mode for carrying out the present invention will now be described hereinafter in detail, the present invention is not restricted thereto.

A basic structural example of an inkjet head according to the present invention will be first explained with reference to the drawings.

Figure 1:
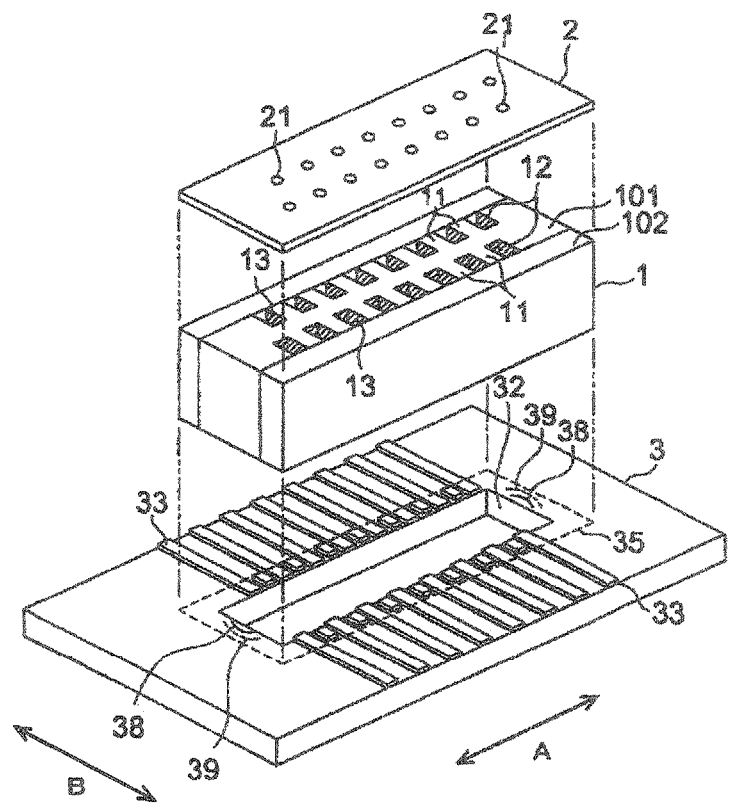
FIG. 1 is an exploded perspective view showing an example of an inkjet head.
Figure 2:
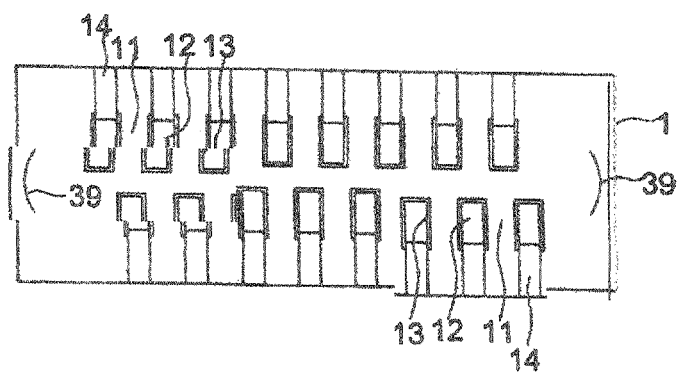
FIG. 2 is a view showing a back surface of a head chip.

FIG. 1 is an exploded perspective view showing an example of an inkjet head, and FIG. 2 is a view showing a back surface of a head chip.

In FIG. 1, reference numeral 1 denotes a head chip; 2, a nozzle plate bonded to an end surface of the head chip 1; and 3, a wiring substrate bonded to a back surface of the head chip 1.

It is to be noted that a surface which corresponds to a nozzle side of the head chip 1 and from which a liquid is discharged is referred to as an "end surface" and a surface on the opposite side is referred to as a "back surface". The head chip 1 is fabricated from a channel member according to the present invention, and a flow direction of an ink is a direction extending from the lower side toward the upper side in FIG. 1.

In the head chip 1 according to the present invention, for example, a plurality of grooves pierced from the back surface to the end surface are formed in a channel member which is formed of a piezoelectric body, a cover plate is bonded to top portions of the grooves, and channel walls 11 made of the channel member and ink channels (which will be also referred to as channels or ink channels) 12 are alternately aligned and configured. A shape of each ink channel 12 is formed in such a manner that wall surfaces of the channel walls 11 on both sides become parallel to each other. An outlet and an inlet of each ink channel 12 are arranged on the end surface and the back surface of the head chip 1, and each ink channel 12 is of a straight type that its size and shape hardly vary along a length direction from the inlet to the outlet.

In this head chip 1, each ink channel 12 has two ink channel columns. Each ink channel column is constituted of eight ink channels 12, but the number of the ink channels 12 constituting each ink channel column in the head chip 1 is not restricted at all.

Here, in this embodiment, the channel member means each of a piezoelectric body 101 having the grooves and a cover plate 102 bonded thereto, and the head chip 1 means a structure constituted of the channel members, the ink channels surrounded by these members, and electrodes (metal layers 13) provided on the channel walls. A drive electrode constituted of the metal layer 13 indicated by hatched lines in FIG. 1 is formed on a surface of each groove in the piezoelectric body 101.

Each metal layer 13 is covered with a transparent protective film having insulating properties for the purpose of avoiding corrosion caused by an ink.

On the back surface of the head chip 1, a connection electrode 14 (a voltage application electrode) extracted from the metal layer 13 in each ink channel 12 is formed. The connection electrode 14 can be formed by vapor deposition or sputtering.

The wiring substrate 3 is a tabular member configured to connect wiring lines through which a drive voltage is applied from a non-illustrated drive circuit to each metal layer 13 in the head chip 1. As a substrate used for this wiring substrate 3, it is possible to adopt, e.g., a substrate made of a ceramics material such as non-polarizing PZT, AIN-BN, or AIN, a substrate made of low-thermal expansion plastic or glass, or a substrate obtained by depolarizing the same substrate material as a substrate material of the piezoelectric body used for the head chip 1. Preferably, to suppress occurrence of deformation or the like of the head chip 1 caused due to a difference in thermal expansion coefficient, a material having a difference in thermal expansion coefficient of ±3 ppm or below based on non-polarizing PZT is selected.

The substrate constituting the wiring substrate 3 is not restricted to a single-plate structure, and a plurality of substrate material sheets may be laminated to form the substrate with a desired thickness.

This wiring substrate 3 has an area larger than that of the back surface of the head chip 1 and has wiring electrodes 33 formed thereon, each wiring electrode 33 extending in a direction (a B direction in the drawing) orthogonal to an alignment direction (an ink channel column direction) of the ink channels 12 in the head chip 1, greatly protruding from the head chip 1, and being configured to connect, e.g., a non-illustrated FPC at each protruding end. Further, the wiring board 3 also greatly protrudes in the alignment direction (an A direction in the drawing) of the ink channels 12 in the head chip 1.

An opening portion 32 is pierced and formed in a substantially central part of the wiring substrate 3. This opening portion 32 is formed into a size that enables exposing inlet-side opening portions of all the ink channels 12 provided on the back surface of the head chip 1.

As a method for forming the opening portion 32, it is possible to adopt, e.g., a method for machining using a dicing saw, a method for machining using an ultrasonic machine, a method for molding ceramics before sintering and then baking the molded material, or a method for forming using a sandblast in accordance with a substrate material.

The same number of the wiring electrodes 33 (voltage application electrodes) as the respective connection electrodes 14 formed on the back surface of the head chip 1 are formed at the same pitch on a front surface of the wiring substrate 3 that serves as a joint surface side for the head chip 1, and they extend from a peripheral edge of the opening portion 32 to an outer edge of the wiring substrate 3. Each wiring electrode 33 is electrically connected to each wiring line formed on, e.g., an FPC at the time of jointing the FPC or the like, and it functions as an electrode configured to apply a drive voltage from the drive circuit to each metal layer 13 in each ink channel 12 through each connection electrode 14.

It is to be noted that positioning patterns 38 configured to position the head chip 1 are formed on the front surface of the wiring substrate 3 besides the wiring electrodes 33. This positioning pattern 38 is fitted to each positioning pattern 39 formed on the back surface of the head chip 1 at the time of joining to the head chip 1, and it is used for positioning the head chip 1.

After an anisotropically conducive adhesive is applied to joint surfaces of both the thus formed wiring substrate 3 and head chip 1, the wiring substrate 3 and the head chip 1 are positioned and overlapped so as to electrically connect each connection electrode 14 of the head chip 1 with each wiring electrode 33 of the wiring substrate 33 as shown in FIG. 1, they are heated and pressurized at a predetermined temperature for a predetermined time, and the adhesive is hardened.

(Nozzle Plate)

In the nozzle plate 2, respective nozzles 21 are opened at positions associated with outlets of the respective ink channels 12 of the head chip 1, and the nozzle plate 2 is joined to the end surface of the head chip 1 by using an adhesive after the head chip 1 is joined to the wiring substrate 3. Therefore, the inlets and the outlets of the respective ink channels 12 and the nozzles 21 are linearly arranged.

Figure 3:
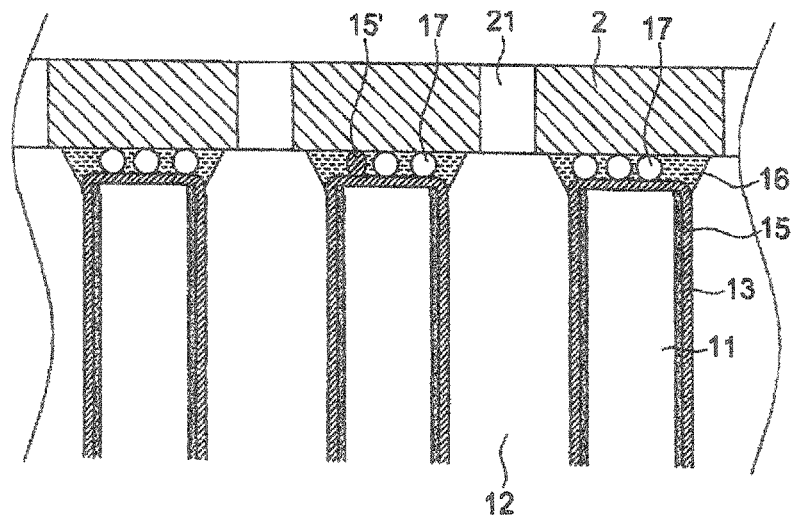
FIG. 3 is a cross-sectional view showing a bonded state of a head chip and a nozzle plate using an adhesive containing spherical particles according to the present invention.

FIG. 3 is a cross-sectional view showing a state that the nozzle plate is bonded to the head chip by using an adhesive as an example of the present invention.

An inkjet head according to the present invention will now be described with reference to FIG. 3.

The head chip 1 has a structure in which the channel walls 11 formed of the channel member and the ink channels 12 partitioned by these walls are alternately aligned by forming the plurality of grooves pierced in the channel member from the back surface to the end surface, a surface of each channel wall on the ink channel side is covered with the metal layer 13, and the metal layer 13 and the end surface of the channel member are covered with a protective film 15.

The end surface of the channel member (an end surface of the head chip) covered with the protective member is bonded to the nozzle plate 2 by using an adhesive 16 containing spherical particles 17.

As shown in FIG. 3, the protective film often abnormally grows, and a convex portion 15' of the protective film (an abnormally grown portion) is formed. When the nozzle plate is bonded by using a regular adhesive as it is, since the nozzle plate is bonded without becoming parallel to the end surface of the head chip, a direction of each nozzle 21 is inclined, and an injection direction bends.

Since the adhesive contains the spherical particles 17, the nozzle plate is lifted up to a height close to the convex portion 15' even on the end surface where the protective film is not convex, and hence the nozzle plate is prevented from being bonded at a slant.

Furthermore, since the spherical particles 17 fill a gap formed between the nozzle plate and the end surface by the convex portion 15' of the protective film, it is possible to avoid formation of a void in the adhesive layer and leakage of an ink in each ink channel 12 into an adjacent ink channel, and hence injection characteristics can be improved.

Figure 4:
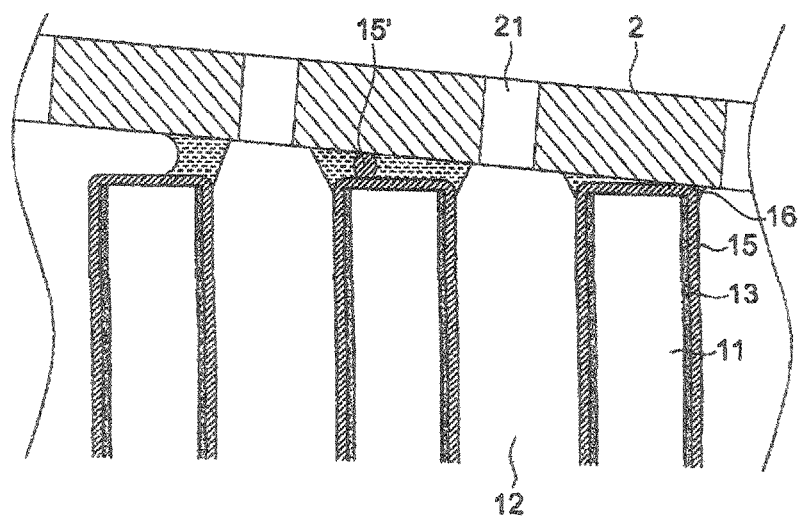
FIG. 4 is a cross-sectional view showing a bonded state of the head chip and the nozzle plate using an adhesive that does not containing spherical particles.

FIG. 4 is a view showing a state that the nozzle plate is bonded to the end surface, on which the protective film has been abnormally grown, by using an adhesive containing no spherical particles. The nozzle plate is inclined due to an abnormally grown portion of the protective film on the central channel wall, a large void is produced at the left channel wall portion where the nozzle plate is lifted up from the end surface, and a direction of each nozzle is also inclined.

Furthermore, as to the end surface of the right channel wall 11 in FIG. 4, since a gap between the end surface and the nozzle plate is narrowed, the adhesive protrudes to the nozzle portion, and the adhesive may possibly flow into the nozzle to cause nozzle clogging. Although FIG. 4 shows the inclination in the narrow column direction, inclination in the injection direction orthogonal to the nozzle columns can likewise occur.

It is preferable for the nozzle plate to have a configuration that a water repellent layer is laminated on the substrate in terms of ejection properties.

The nozzles of the substrate must be easily drilled in the substrate, and the substrate must resist a heat treatment for improving durability of the water repellent layer and must have high resistance against various kinds of inks. In view of these points, polyimide or silicon is preferably used for the substrate.

Among others, since silicone has a thermal expansion coefficient close to that of the channel member that is configured with a PZT which is the piezoelectric body as a main constituent, even if the adhesive is heated for hardening at the time of bonding the nozzle plate, positions of the respective ink channels 12 (which are also referred to as ink channels) hardly deviate from positions of the nozzles in the nozzle plate at both ends of the nozzle plate, which is preferable. Furthermore, flatness of the nozzle plate is good, and an accuracy in the ejecting direction is high.

On the other hand, since silicon is generally harder than a resin such as polyimide used as a material of the nozzle plate, it hardly becomes parallel to irregularities on the end surface of the head chip, and an area where a void is produced in the adhesive layer tends to increase. Moreover, since silicon is apt to get broken when force is applied thereto, the nozzle plate cannot be pressed against silicon even if a void is formed.

To avoid production of the void, when an amount of the adhesive applied to the end surface of the head chip is increased, the adhesive flows into the nozzles, and hence an application amount cannot be immoderately increased.

At the time of transferring the adhesive to the end surface of the head chip, to avoid an ejection defect caused when the adhesive flows into the nozzles or the ink channels, it is preferable for an application thickness of the adhesive to be not smaller than 1 μm and not greater than 25 μm. Even though the adhesive has such an application thickness, the adhesive containing the spherical particles according to the present invention maintains the nozzle plate to be parallel to the end surface and prevents a void from being produced without increasing the number of steps.

Although applying the adhesive to at least one of the end surface of the head chip and the joint surface of the nozzle plate can suffice, applying the adhesive to the end surface of the head chip like this embodiment is preferable since the effect of the present invention can be enhanced.

(Average value Rz (MV) of Maximum Height)

An average value of the maximum height can be obtained by the following method.

The following probe type surface roughness tester is used, a reference length lr=2.5 mm is determined, and five positions on a surface of the head main body that is bonded to the nozzle plate are randomly selected and measured so that these positions do not get across a joint line of each ink channel or each member.

Therefore, in case of measuring the five positions in one scanning operation, an evaluation length is 12.5 mm, and a sample of 12.5 mm or above is required, but a line to be scanned may be displaced and scanning may be performed several times if a length of a sample is less than 12.5 mm A roughness curve is obtained based on an acquired measured cross section curve.

Based on the roughness curve, a roughness parameter maximum height Rz specified by JIS B 0601:2001 is obtained.

Rz at the five positions are averaged, and an average value Rz (MV) of the maximum height is obtained.

A probe type surface roughness tester: a small surface roughness tester Surftest SJ-400 (manufactured by Mitutoyo Corporation)

When the average value Rz (MV) of the maximum height is not smaller than 5 μm and not greater than 25 μm, the effect of the present invention is prominent.

If this value is not smaller than 5 μm, the spherical particles fill irregularities on the end surface of the head chip, an effect of flattening an interface of the adhesive and the nozzle plate is considerable but, if this value is not greater than 25 μm, flattening can be carried out to the level that enables obtaining the excellent ejection properties.

(Protective Film)

As the protective film, it is preferable to use a film made of polyparaxylylene and/or its derivative (which will be referred to as a Parylene film hereinafter) and perform coating. The Parylene film is a resin film made of a polyparaxylylene resin and/or its derivative resin, and it is formed by a chemical vapor deposition (CVD) method using a solid diparaxylylene dimer or its derivative as a deposition source. That is, a paraxylylene radical produced by vaporizing and pyrolyzing a diparaxylylene dimer adsorbs onto a surface of the channel member or the metal layer, causes a polymerization reaction, and forms the film.

As the Parylene film, there are various Parylene films, and various Parylene films or a Parylene film having a multilayer configuration in which these various Parylene films are laminated can be applied as desired Parylene films in accordance with necessary performance and others.

It is preferable to set a film thickness of such a Parylene film to 1 μm or more and 10 μm or less. If the film thickness is 1 μm or more, an electrode protecting function is high and ink resisting properties are good. Further, a size of the convex portion formed due to abnormal growth enlarges as the film thickness increases but, if the film thickness is not greater than 10 μm, it is possible to fabricate an inkjet head having high ejection performance by using the adhesive containing spherical particles according to the present invention.

Since the Parylene film penetrates into a fine region and can form a film, when a film is formed with respect to a joint body having the head chip 1 and the wiring substrate 3 jointed to each other before jointing the nozzle plate 2, the metal layer 13 (the drive electrode) as well as the end portion of the channel member to which the wiring substrate 3 and the nozzle plate are bonded can be covered with the Parylene film and protected against the ink.

When this Parylene film is formed, the wiring lines and each metal layer 13 can be protected from both surfaces thereof, and their durability can be greatly improved.

(Polyparaxylylene and Derivative of Polyparaxylylene)

The polyparaxylylene is a crystalline polymer whose molecular weight reaches 500,000, and a paraxylylene radical is generated by sublimating and pyrolyzing a paraxylylene dimer as a starting material. The paraxylylene radical adheres to the inkjet head and polymerizes at the same time, generates polyparaxylylene, and forms a protective film.

A starting material of the polyparaxylylene is available as Parylene N (a trade name from Parylene Japan K.K.).

As the polyparaxylylene derivative, Parylene C in which a benzene ring is substituted by one chlorine atom, Parylene D in which second and fifth positions on the benzene ring are substituted by chlorine atoms, and Parylene HT in which a hydrogen atom in a methylene group connecting the benzene ring is substituted by a fluorine atom are registered as trade names from Parylene Japan K.K., and starting materials are available.

On the other hand, the Parylene film may abnormally grow at the time of forming a film. A size of a convex portion of the Parylene film formed by abnormal growth is reflected on the maximum height Rz.

The maximum height of the Parylene film is affected by irregularities of the channel member, presence/absence of foreign particles on the channel member surface, and a thickness of the Parylene film. If an average film of the Parylene film is not smaller than 1 µm and not greater than 10 µm, the maximum height Rz (measured based on the reference length 2.5 mm) specified by JIS B0601:2001 is approximately not smaller than 5 µm and not greater than 25 µm. When Rz (MV) which is the average value of the maximum height is not smaller than 5 µm and not greater than 25 µm, the effect of the present invention is considerable and preferable. However, Rz (MV) is an average value of Rz measured at five positions.

(Spherical Particles)

The spherical particles are contained in the adhesive used for jointing the end surface of the head chip covered with the protective film to the nozzle plate. Assuming that the average value of the maximum height of the protective film is Rz (MV), since a volume average particle diameter of the spherical particles is not smaller than 0.95×Rz (MV) and not greater than 2.0×Rz (MV), flatness of the nozzle plate is improved, and bend of ejection can be avoided. Furthermore, if the volume average particle diameter of the spherical particles is not smaller than 0.95×Rz (MV) and not greater than 1.6×Rz (MV), the effect of the present invention is prominent and preferable.

Here, the particle diameter means a diameter of each spherical particle.

As a coefficient of variation for the particle diameter of the spherical particle, 1.8% or below is preferable, and a range of 1.3% to 1.8% is more preferable. In case of 1.8% or below, an adhesive having no void is hardly formed, and the spherical particle of 1.3% or above is easily available.

The coefficient of variation (which will be also referred to as a CV value) is a value obtained by dividing a standard deviation of a particle size distribution, which is obtained by plotting a particle size on an abscissa and a quantity on an ordinate, by a volume average particle diameter.

Here, the particles contained in the adhesive are the spherical particles because, in case of irregular particles, when the particles contained in the adhesive are applied to a convex portion (an abnormally grown portion) of the protective film in an overlapping manner at the time of applying the adhesive, the particles do not move due to their shape even though they are pressurized at the time of jointing the members, and hence they are apt to stay on the convex portion of the protective film in the overlapping manner. In case of the spherical particles, even if the particles are applied to the convex portion of the protective film in the overlapping manner, the particles move in the adhesive at the time of leveling of the adhesive, and they do not overlap the convex portion of the protective film.

As a material of the spherical particles, there are an inorganic compound and an organic polymer.

As inorganic compounds, although there are silica, glass and a metal oxide such as zirconia, silica is preferable in terms of a particle diameter control accuracy.

As organic compounds, although there are polymethylmethacrylate, a polymethacrylate, an acrylic copolymer, cross-linked polystyrene, a silicone resin, and others, the silicone resin is preferable in terms of a particle diameter control accuracy.

As spherical particles when an inorganic compound is used as a material, for example, Hyprecica TS N3N (a volume average particle diameter: 3 to 12 µm (which can be designated in increments of 0.1 µm), 13 to 20 µm (which can be designated in increments of 1 µm), 25 µm, or 30 µm, manufactured by Ube-Nitto Kosei Co., Ltd.), Hyprecica BS (a volume average particle diameter: 12 to 60 µm, manufactured by Ube-Nitto Kosei Co., Ltd.), Q-CEL5070s using glass as its material (an empty particle having an average particle diameter of 40 µm and specific gravity of 0.2, manufactured by Potters-Ballotini Co., Ltd.), Q-CEL5020FPS (an empty particle having an average particle diameter of 60 µm and specific gravity of 0.2, manufactured by Potters-Ballotini Co., Ltd.), empty glass particles Fuji Balloon H30 (an average particle diameter: 40 µm, specific gravity: 0.20), S-35 (an average particle diameter: 40 µm, specific gravity: 0.24), S-40 (an average particle diameter: 40 µm, specific gravity: 0.26), and S-45 (an average particle diameter: 40 µm, specific gravity: 0.28) manufactured by Fuji Silysia Chemical Ltd., Sphericel 110P8 (an empty glass particle having an average particle diameter of 12 µm and specific gravity of 1.1, manufactured by Potters-Ballotini Co., Ltd.), Sphericel 60P18 (an empty glass particle having an average particle diameter of 18 µm and specific gravity of 0.6, manufactured by Potters-Ballotini Co., Ltd.), and others are commercial available.

As spherical particles when an organic compound is used as a material, for example, there are "Tospearl 1110" (a silicone resin having a volume average particle diameter of 11.0 µm manufactured by Momentive Performance Materials Japan Inc.), MX-1500 (a cross-linked methacrylic acid ester copolymer fine particle having a volume average particle diameter of 15.0 µm manufactured by Soken Chemical Engineering Co., Ltd.), MX-3000 (a cross-linked methacrylic acid ester copolymer fine particle having a volume average particle diameter of 30.0 µm manufactured by Soken Chemical Engineering Co., Ltd.), SGP series SX-350H (cross-linked polystyrene fine powder manufactured by Soken Chemical Engineering Co., Ltd.), SGP series SX-500H (cross-linked polystyrene fine powder manufactured by Soken Chemical Engineering Co., Ltd.), Epostar (a registered trade mark) benzoguanamine L15 (a formaldehyde condensate having an average particle diameter of 10 to 15 μm manufactured by Nippon Shokubai Co., Ltd.), Epostar (a registered trade mark) MA1013 (a polymethacrylic acid methyl base crosslinking substance having an average particle diameter of 12 to 15 μm manufactured by Nippon Shokubai Co., Ltd.), and others.

(Method for Measuring Volume Average Particle Diameter)

A standard particle (a particle diameter is known) is used, and a Coulter counter is calibrated.

The calibrated Coulter counter is used, a particle size distribution is measured, and a volume average particle diameter and a CV value (a coefficient of variation) are acquired.

A measured quantity: 50000

Model name of the Coulter counter: Multisizer III (manufactured by Beckman Coulter Inc.)

(Content of Spherical Particles)

The percentage content of the spherical particles with respect to the adhesive is in the range of 0.1 volume % to 10 volume %. The nozzle plate cannot be sufficiently supported and inclination of the nozzle plate cannot be avoided if the content is less than 0.1 volume %, or the spherical particles overlap each other or overlap the convex portion (the abnormally grown portion) of the protective film and flatness cannot be improved if the percentage content exceeds 10 volume %.

More preferably, the percentage content of the spherical particles with respect to the adhesive is in the range of 0.2 volume % to 8 volume %.

(Adhesive)

It is preferable for the adhesive to contain the spherical particles and a curable resin. The curable resin preferably contains a main agent made of an epoxy resin and a curing agent.

As curing, curing by heat or curing by irradiating ultraviolet rays is preferable and, among others, curing by irradiating ultraviolet rays is preferable since it can prevent the adhesive from flowing into the nozzles and a positional accuracy for adhesion is high.

As the epoxy resin that is applicable to the adhesive, both a monomer which is a compound having an epoxy group and its oligomer can be used. Specifically, there are conventionally known an aromatic epoxy compound, alicyclic epoxy compound, and aliphatic epoxy compound. It is to be noted that the epoxy compound means a monomer or its oligomer in the following description.

In the present invention, it is preferable for the epoxy compound to contain an aromatic epoxy compound in the range of 70 mass % to 100 mass % in the epoxy compound.

(Aromatic Epoxy Compound)

As the aromatic epoxy compound, di or polyglycidyl ether manufactured by a reaction of polyphenol having at least one aromatic nucleus or its alkylene oxide adduct and epichlorohydrin is preferable and, for example, there are di- or polyglycidyl ether of bisphenol A or its alkylene oxide adduct, di- or polyglycidyl ether of hydrogenated bisphenol A or its alkylene oxide adduct, a bisphenol F epoxy resin, and a novolac-type epoxy resin, and others. Here, as the alkylene oxide, there are ethylene oxide, propylene oxide, and others.

It is preferable to contain the aromatic epoxy compound in the range of 70 mass % to 100 mass % in the epoxy rein in terms of durability against an ink.

(Novolac-type Epoxy Resin)

The novolac-type epoxy resin is a compound having a plurality of glycidyl groups in one particle generated by a reaction of a hydroxyl group of a novolac resin and epichlorohydrin. The number of the epoxy groups in one molecule has a distribution, and its average value differs depending on synthesis conditions, 3 or more is preferable as an average of the number of epoxy groups in one molecule.

As commercially available products, there are jER152 (a phenol novolac epoxy resin manufactured by Japan Epoxy Resin Co., Ltd.), jER154 (a phenol novolac epoxy resin manufactured by Japan Epoxy Resin Co., Ltd.), EPICLON N-660 (a cresol novolac epoxy resin manufactured by DIC Corporation), and others.

It is preferable to contain the novolac-type epoxy resin in the range of 5 mass % to 50 mass % in the epoxy resin since high durability against an ink can be obtained.

(Alicyclic Epoxy Compound)

In the present invention, it is preferable for the epoxy resin containing the novolac-type epoxy resin to further contain an alicyclic epoxy compound since high luminous sensitivity can be obtained.

As the alicyclic epoxy compound, there is, e.g., a cyclohexene oxide- or cyclopentene oxide-containing compound, or the like that can be obtained by epoxidizing a compound having at least one cycloalkane ring such as a cyclohexene or cyclopentene ring by using an appropriate oxidant such as hydrogen peroxide or peracid. Specifically, there are (3,4-epoxycyclohexyl)methyl-3',4'-epoxycyclohexylcarboxylate, bis-(2,3-epoxycyclopentyl)ether, and others.

As an additive amount of the alicyclic epoxy compound, a range of 1 mass % to 50 mass % with respect to the entire epoxy resin is preferable. Luminous sensitivity is high and flowing can be suppressed if the additive amount is not smaller than 1 mass %, and high durability can be obtained if the additive amount is not greater than 50 mass %.

(Curing Agent)

As the curing agent for curing by heat, there are polyamine, dicyandiamide, an imidazole derivative, a cationic hardening agent, and others, but imidazoles are preferable since they can be cured at a heating temperature that does not adversely affect the inkjet performance and have high ink resisting properties.

As the imidazoles, there are 2-ethyl-4-methylimidazole, 1-benzyl-2-methylimidazole, 1,2-dimethylimidazole, and others.

As the curing agent for curing by irradiation of ultraviolet rays, a photo cationic polymerization initiator is preferable. As the photo cationic polymerization initiator, any known photoacid generator can be used. As the photoacid generator, for example, a compound used for chemically-amplified photoresist or photo cationic polymerization is used (see "Imaging Organic Material", pp. 187-192, edited by The Japan Research Association for Organic Electronics Materials, published by Bunshin Design Printing Publishing and Digital Communications (1993)).

Firstly there are a $B(C_6F_5)_4^-$, $PF_6^-$, $AsF_6^-$, $SbF_6^-$ or $CF_3SO_3^-$ salt of aromatic onium compounds such as diazonium, ammonium, iodonium, sulfonium, phosphonium, and others, secondly there is a sulfonate compound that generates a sulfonic acid, thirdly a halide that photo-generates hydrogen halide can be used, and fourthly there is an iron allene complex. For example, there are hexafluorophosphate, hexafluoroantimonate or pentafluorophenylborate salt of diallyliodonium or triallylsulfonium, and others, and they are commercially available under the trade names of Irgacure-261 (manufactured by BASF Japan Ltd.), SP-150 or SP-170 (manufactured by ADEKA Corporation), PI 2074 or UVI-6992 (manufactured by Dow Chemical), and others.

When the adhesive that is curable by ultraviolet rays further contains a thermosetting agent, curing of the adhesive can be promoted, and ink resisting properties of the cured adhesive can be improved, which is preferable.

As the thermosetting agent that can be used with the photo cationic polymerization initiator, a thermal cationic polymerization initiator is preferable. As the thermal cationic polymerization initiator, a boron trifluoride amine complex, sulfonium salt, an aluminum complex, or the like is used. Of these materials, the boron trifluoride amine complex is preferable since it has high ink resisting properties, and a boron trifluoride aniline complex is particularly preferably used.

EXAMPLES

Fabrication of Inkjet Head (Fabrication of Head Chip)

The head chip having the configuration shown in FIG. 1 to FIG. 3 was fabricated by the following method.

A PZT substrate (lead zirconate titanate, a thickness: 700 μm, a Curie temperature: 210° C.) and a PZT substrate (a thickness: 150 μm, a Curie temperature: 210° C.) were jointed with use of an adhesive so that their polarizing directions become opposite. Then, a resist layer was transferred onto each of a surface (a front surface) on the PZT substrate side having the thickness of 150 μm and a surface (a back surface) of the PZT substrate side having the thickness of 700 μm, the resist layer was provided, then a groove having a depth of 300 μm and a width of 70 μm was formed from the surface over a length of 30 mm at a pitch of 140 μm, and 512 ink channel grooves and channel walls 11 that partition these grooves are formed. Subsequently, each metal layer 13 made of nickel with a thickness of 1 μm was formed on a surface of each groove by a plating method, and then the resist on the channel wall top portion and the resist on the back surface were delaminated together with a nickel plated layer on the resist.

A cover plate (a depolarized PZT having a thickness of 700 μm) was jointed to the surface from which the resist on the channel wall top portion has been delaminated, whereby a chip having a plurality of ink channels surrounded by the ink channel grooves and the cover plate was formed. The two chips were bonded in such a manner that the cover plate is provided on the outer side and the ink channels become parallel to each other, thereby forming a head chip having two channel columns Subsequently, the head chip was cut along a direction orthogonal to a channel direction at intervals of 2 mm, whereby a plurality of head chips having a channel length L of 2 mm were formed.

In each of the thus fabricated head chips, drive walls (channel walls) formed of a piezoelectric element and channels are alternately aligned.

To enable connecting a wiring substrate 3 configured to apply a drive voltage to a drive electrode in each channel from a drive circuit, each metal layer 13 (the drive electrode) was pulled out to an outer surface of the head chip. That is, a resist was transferred onto a back surface of each of the cut surfaces, a resist layer was provided, a pattern was formed by exposure and development, then aluminum was evaporated, and the resist was removed, thereby forming each connection electrode 14.

(Jointing of Wiring Substrate)

Further, the wiring substrate 3 was jointed to and provided on the back surface of the head chip as a plate-like member configured to connect a wiring line that applies a drive voltage from a non-illustrated drive circuit to each connection electrode 14 leading to each drive electrode of the head chip. As a substrate used for this wiring substrate 3, to suppress occurrence of deformation of the head chip due to a difference in thermal expansion coefficient, a glass plate was selected so that a difference in thermal expansion coefficient from the head chip can be within ±1 ppm.

Furthermore, an opening portion 32 was pierced and formed at a substantially central part of the wiring substrate 3. This opening portion was formed with a size that allows exposure of inlet sides of all ink channels of the head chip. When this opening portion was provided, in a state that the wiring substrate is jointed to the back surface of the head chip, all the drive walls, all ink channels, and all drive electrodes of the head chip can be seen through this opening portion.

Moreover, on a surface of the wiring substrate 3 as the joint surface side for the head chip, wiring electrodes 33 were formed so as to be equal in number and pitch with the respective connection electrodes 14 formed on the back surface of the head chip, and the wiring electrodes 33 extend to respective wiring connecting portions. Each of these wiring electrodes is electrically connected to each wiring line formed on the FPC at the time of jointing the FPC, and it functions as an electrode configured to apply a electric power to the drive electrode in the ink channel through the connection electrode.

Each wiring substrate was positioned and jointed to the back surface of the head chip with an anisotropic conductive adhesion in such a manner that each wiring electrode can be electrically connected to each connection electrode and the opening portion can expose all channels of the chip.

(Formation of Protective Film)

(Formation of Protective Film According to Each of Examples 1 to 3, 5 to 11, and Comparative Examples 1 to 9)

After jointing the wiring substrate, each wiring electrode configured to joint an FPC is protected by a masking tape, and a film of "Parylene C" (a trade name from Parylene Japan K.K.; Parylene is a registered trade name) is formed on an ink channel inner surface including each drive electrode and an exposed portion of a cross section including each connection electrode 14 by a CVD method.

"Labocoater PDS 2010 type vacuum deposition system" manufactured by "Parylene Japan K.K." was used, 50 g of a powdery monochloroparaxylylene dimer which is a starting material dimer of the starting material "Parylene C" was vaporized in a sublimation furnace at 190° C., the vaporized monochloroparaxylylene dimer was thermally decomposed in a pryolytic furnace at 680° C., a monochloroparaxylylene radical was generated, the generated monochloroparaxylylene radial was introduced into a film formation tank depressurized to 13.3 Pa, a Parylene film having an average film thickness of 5 μm was formed on the ink channel inner surface including each drive electrode and the exposed portion of the cross section including each connection electrode by controlling a film formation time, and a head chip A having the wiring substrate and the protective film according to each of Examples 1 to 3, 5 to 11 and Comparative Examples 1 to 9 was fabricated.

(Formation of Protective Film according to Examples 4 and 12)

A protective film was formed in the same manner as in (formation of the protective film according to Example 1) except that a film formation time was prolonged and an average film thickness of the Parylene film was set to 7.5 µm, and a head chip B having the wiring substrate and the protective film according to each of Examples 4 and 12 was fabricated.

(Easy Adhesion Processing)

Plasma exposure (a starting material gas: oxygen, output of 200 W) was performed with respect to the head chips A and B for two minutes.

(Measurement of Average Value Rz (MV) of Maximum Height)

Five positions on a nozzle plate joint surface subjected to the easy adhesion processing were measured by the above-described (the average value Rz (MV) of the maximum height) method, and Rz (MV) was obtained. Table 2 shows a result.

In Table 2, Rz (MV) in each of Examples 4 and 12 is 15 µm, and this value is larger than those in other Examples and Comparative Examples since a thickness of the protective film was increased.

Example 1

Fabrication of Inkjet Head 1

(Fabrication of Silicon Nozzle Plate (Method for Forming Nozzles))

A silicon substrate having a plurality of silicon nozzle plates each having a thickness of 200 µm was formed as follows, each silicon nozzle plate having two nozzle columns, each nozzle columns having 512 holes each having a diameter (a nozzle diameter) of 23 µm and a depth of 40 µm in a small-diameter portion and a diameter of 40 µm and a depth of 160 µm in a large-diameter portion aligned at intervals of 141 µm.

A photoresist having a thickness of 1 µm was applied to an ink discharge-side surface of the silicon substrate having a thermal oxide film provided thereon by a spin coat method, and a resist layer was formed. A photomask was used, exposure was carried out using a mask aligner, then development and an etching treatment were performed, and a nozzle hole machining pattern having 512 holes with a diameter of 23 µm aligned in a line at intervals of 141 µm was formed.

Moreover, a photoresist was applied to an ink introduction-side surface of the silicon substrate having a thermal oxide film provided thereon, a photomask was used, exposure was carried out using a mask aligner, then development and an etching treatment were performed, and a nozzle hole machining pattern of the large-diameter portion having 512 holes with a diameter of 40 µm aligned in a line at intervals of 141 µm was formed.

Subsequently, the silicon substrate was fixed on a dummy silicon wafer, a pattern film formed by partially removing a thermal oxide film with use of the resist layer as an etching mask was utilized, and a dry etching treatment was carried out based on a Bosch process, whereby a nozzle large-diameter portion having a depth of 160·m was formed.

Additionally, the silicon substrate was turned over and fixed on a dummy silicon wafer, and the silicon substrate was subjected to the dry etching treatment based on the Bosch process, thereby forming a nozzle small-diameter portion having a depth of 40 µm.

(Method for Forming Water Repellent Film)

A coating solution having 1% of perfluoroalkylsilane (heptadecafluorodecyltrimethoxysilane $(C_8F_{17}CH_2CH_2Si(OCH_3)_3$ [a trade name: TSL8233, manufactured by Toshiba Silicone Co., Ltd.]) which is a water repellent material added thereto was applied to the fabricated silicon substrate, and this substrate was dried at an ordinary temperature and then baked at 100° C. for two hours, thereby forming a water repellent film.

Individual silicon nozzle plates were separated from the silicon substrate by dividing the substrate along a half etching portion formed at the time of nozzle machining.

(Fabrication of Adhesive)

Hyprecica TS (silica spherical particles; a CV value 1.47, specific gravity 2.0, manufactured by Ube-Nitto Kasei Co., Ltd.) having a volume average particle diameter of 12.11 µm was added to and dispersed in the following main agent and the hardener 1 so as to be 2 volume % with respect to the entire adhesive. In addition, as to mixture, specific gravity of the main agent and the hardener 1 was determined as 1.2, a mass ratio of the main agent, the hardener 1, and the spherical particles was obtained from the volume %, these members were mixed based on weighting, and the adhesive was fabricated. It is to be noted that a volume average particle diameter of each spherical particle was measured by the following method.

(Measurement of Volume Average Particle Diameter and CV Value of Spherical Particles)

A Multisizer III (manufactured by Beckman Coulter Inc.) coulter counter and a standard particle of 15 µm (manufactured by Beckman Coulter Inc.) were used, a particle diameter distribution was measured, and a volume average particle diameter and a CV value were obtained.

The measured quantity: 50,000

<Main Agent and Curing Agent>

(Main Agent and Curing Agent 1)

jER807 (a bisphenol F type epoxy resin manufactured by Japan Epoxy Resin Co., Ltd.)

100 parts by mass 2-ethyl-4-methylimidazole (manufactured by Chugoku Kasei Kogyo)

10 parts by mass viscosity: 3000 mPa·s (Adhesion of Nozzle Plate)

The adhesive with a thickness of 13.5 µm was transferred and applied to an end surface of the fabricated head chip A. The film thickness of the adhesive applied to the end surface of the head chip A by transfer was adjusted by controlling an amount of application of the adhesive to the transfer sheet based on application using a bar coater.

Then, the nozzle plate was jointed to a predetermined position on the end surface of the head chip A having the adhesive applied thereto while performing observation using an optical microscope.

Subsequently, the adhesive was cured under the following curing conditions 1.

(Curing Condition 1)

Heating at 100° C. for one hour.

(Jointing of Common Ink Chamber, Jointing of Electrode)

An FPC was jointed to each wiring electrode on the wiring substrate, and a common ink chamber was jointed to the back surface of the wiring substrate, thereby fabricating an inkjet head 1. An ink was introduced from the common ink chamber into each ink channel of the chip through the opening portion of the wiring substrate so that a drive voltage can be applied from an external drive circuit through the FPC.

The same 10 inkjet heads 1 were fabricated.

Examples 2 to 12, Comparative Examples 1 to 8

Fabrication of Inkjet Heads 2 to 20

In fabrication of the inkjet head 1, 10 inkjet heads were fabricated for each of reference numerals 2 to 21 in the same manner except that the head chip A or B, the main agent, the curing agent, the spherical particles, the adhesive application thickness, the curing conditions, Rz (MV) of the head chip end surface, and the substrate of the nozzle plate were changed as shown in Tables 1 and 2. The adhesive application thickness was set so as to be equal to or above the volume average particle diameter of the spherical particles.

It is to be noted that the head chip A or B fabricated as described above was used for bonding of the nozzle plate. Therefore, Rz (MV) of the head chip end surface is a measured value of the head chip fabricated as described above (the formation of the protective film).

Items in Tables 1 and 2 excluding the items described in conjunction with the fabrication of the inkjet head 1 will now be explained hereinafter.

[Fabrication of Polyimide Nozzle Plate]

A surface treatment using oxygen plasma was performed with respect to a polyimide sheet having a thickness of 100 μm, and a water repellent film was formed in the same manner as the water repellent film forming method in the fabrication of the silicon nozzle plate.

A laser beam was applied from the opposite surface for hole formation, nozzles each having a diameter of 30 μm were formed, and a nozzle plate using polyimide as a substrate was fabricated.

<Main Agent and Curing Agent>

| (Main Agent and Curing agent 2) | |
|---|---|
| jER807 (a bisphenol F type epoxy resin; manufactured by Japan Epoxy Resin Co., Ltd.) | 60 parts by mass |
| jER152 (a novolac type epoxy resin; manufactured by Japan Epoxy Resin Co., Ltd.) | 40 parts by mass |
| 2-ethyl-4-methylimidazole (manufactured by Chugoku Kasei Kogyo Co., Ltd.) Viscosity: 25000 mPa · s | 10 parts by mass |
| (Main Agent and Curing agent 3) | |
| jER807 (a bisphenol F type epoxy resin; Japan Epoxy Resin Co., Ltd.) | 50 parts by mass |
| Celloxide 2021 (3,4-epoxycyclohexenylmethyl-3',4'-epoxycyclohexenecarboxylate, manufactured by Dicel Corporation) | 50 parts by mass |
| 2-ethyl-4-methylimidazole (manufactured by Chugoku Kasei Kogyo Co., Ltd.) Viscosity: 500 mPa · s | 10 parts by mass |
| (Main Agent and Curing agent 4) | |
| jER807 (a bisphenol F type epoxy resin; manufactured by Japan Epoxy Resin Co., Ltd) | 50 parts by mass |
| Celloxide 2021 (3,4-epoxycyclohexenylmethyl-3',4'-epoxycyclohexenecarboxylate, manufactured by Dicel Corporation) | 50 parts by mass |
| UVI6992 (a photo cationic polymerization initiator; manufactured by Dow Chemical) | 4 parts by mass |
| boron trifluoride aniline (a thermal cationic polymerization initiator; PTI Japan) | 2 parts by mass |

(Spherical Particles)

Tospearl 1110 having a volume average particle diameter of 11 μm is a manufactured by Momentive Performance Materials Japan Inc. and has specific gravity of 1.32. MX3000 having a volume average particle diameter of 30 μm is manufactured by Soken Chemical Engineering Co., Ltd. and has specific gravity of 1.2. The spherical particles and the main agent/hardener were converted into each mass, weighted, and mixed while making reference to each specific gravity. At the time of conversion, the specific gravity of the main agent and the hardeners 2 to 4 was determined as 1.2.

(Curing Conditions 2)

A high-pressure mercury lamp is used in order to apply light from the back surface of the head chip A or B at a room temperature with a dose of 500 mJ/cm$^2$, and then the head chip is heated at 100° C. for one hour.

It is to be noted that the dose is a value obtained by placing an actinometer that measures light of 365 nm on the end surface of the head chip before applying the adhesive to the head chip A or B, applying light of the high-pressure mercury lamp from the chip back surface as described above, and dividing a measured light volume by an aperture ratio of the chip (corresponding to a dose received by the nozzle plate at the time of jointing the nozzle plate).

Comparative Example 9

Fabrication of Inkjet Head 21

FIG. 5 shows a method for fabricating the inkjet head.

Step 1. The drawing shows a state that an abnormally grown portion 15' was produced on an end surface when a channel wall 11 was covered with a protective film 15.

Step 2. The drawing shows a state that the abnormally grown portion was buried in a photoresist layer 50 and irregularities on the surface were reduced when the photoresist layer 50 was transferred to the end surface.

Step 3. Ultraviolet rays 52 are applied to the photoresist layer through a mask pattern 51, and development is performed.

Step 4. A pattern 53 of the photoresist layer having a uniform thickness is formed on the end surface.

Step 5. The adhesive is transferred to the end surface on which the pattern was formed at Step 4, and a nozzle plate is bonded.

Rz (MV) of the head chip end surface of each of the head chips A and B, the adhesive, the nozzle plate, the adhesive application thickness, the hardening conditions are as shown in Tables 1 and 2.

Although the inkjet head 21 is fabricated through Steps 1 to 4, it has a drawback that the number of step is large. Further, since the number of steps is large, a process error is apt to occur, the resist pattern cannot be necessarily uniformly fabricated on the end surface, and the convex portion of the photoresist was inhomogeneously formed.

(Evaluation)

(Void in Adhesive Layer)

The same 10 inkjet heads were observed from the nozzle plate side by using an infrared microscope, and they were judged based on the following criteria.

⊚: In the 10 inkjet heads, there is no void that is pierced between the ink channels adjacent to each other or between the ink channel and the outside on the end surface of the head chip.

○: In one to three out of the 10 inkjet heads, there is an ink channel having a void that is pierced between the ink channels adjacent to each other or between the ink channel and the outside on the end surface of the head chip.

Δ: In four to six out of the 10 inkjet heads, there is an ink channel having a void that is pierced between the ink channels adjacent to each other or between the ink channel and the outside on the end surface of the head chip.

X: In seven to 10 out of the 10 inkjet heads, there is an ink channel having a void that is pierced between the ink channels adjacent to each other or between the ink channel and the outside on the end surface of the head chip.

(Non-ejection due to Nozzle Clogging)

In regard to the respective 10 fabricated inkjet heads, there was conducted an ejection test that an ink made of a mixed solution containing 70:30 of butoxyethyl acetate and cyclohexanone is introduced, a pulse signal is transmitted from a drive circuit to each head, the ink is ejected, and an ejection state of the nozzle is observed.

In the ejection test, ink droplets ejected from each nozzle were observed through a video camera.

When there was a nozzle that does not eject the ink, after end of the ejection test, this nozzle was observed through a microscope to confirm whether the adhesive flowed into the nozzle, and the following criteria were used to make a judgment based on the number of inkjet heads that have nozzles in which non-ejection occurred due to inflow of the adhesive.

⊚: In the 10 inkjet heads, there is no nozzle in which non-ejection occurred due to inflow of the adhesive.

○: In one to three out of the 10 inkjet heads, there are nozzles in which non-ejection occurred due to inflow of the adhesive.

Δ: In four to six out of the 10 inkjet heads, there are nozzles in which non-ejection occurred due to inflow of the adhesive.

X: In seven to 10 out of the 10 inkjet heads, there are nozzles in which non-ejection occurred due to inflow of the adhesive.

(Ink Ejection Properties)

In the ejection test, if one inkjet head has a nozzle having an ejection angle that is different from an average value of ejection angles of all nozzles by 1.5° or above, this case is determined as a defect caused due to bend.

⊚: In the 10 inkjet heads, there is no defect caused due to bend.

○: In one to three out of the 10 inkjet heads, a defect due to bend occurs.

Δ: In four to six out of the 10 inkjet heads, a defect due to bend occurs.

X: In seven to 10 out of the 10 inkjet heads, a defect due to bend occurs.

Table 2 shows the evaluation result.

TABLE 1

| | | | | ADHESEVE | | | | | |
| | | | | SPHERICAL PARTICLE | | | | | |
| | INKJET HEAD | HEAD CHIP A OR B | MAIN AGENT AND HARD-ENER | TRADE NAME | VOLUME AVERAGE PARTICLE DIAMETER (μm) | PER-CENTAGE CONTENT (VOLUME %) | CV VALUE (%) | APPLI-CATION THICK-NESS (μm) | HARD-ENING CONDI-TIONS | REMARKS |
|---|---|---|---|---|---|---|---|---|---|---|
| EXAMPLE 1 | 1 | A | 1 | HYPRECICA TS | 12.13 | 2.0 | 1.47 | 13.5 | 1 | PRESENT INVENTION |
| EXAMPLE 2 | 2 | A | 1 | HYPRECICA TS | 15.13 | 2.0 | 1.71 | 17.0 | 1 | PRESENT INVENTION |
| EXAMPLE 3 | 3 | A | 1 | HYPRECICA TS | 19.31 | 2.0 | 1.34 | 22.0 | 1 | PRESENT INVENTION |
| EXAMPLE 4 | 4 | B | 1 | HYPRECICA TS | 19.83 | 2.0 | 1.71 | 22.0 | 1 | PRESENT INVENTION |
| COMPARATIVE EXAMPLE 1 | 5 | A | 1 | TOSPEARL | 11.00 | 2.0 | 8.00 | 13.5 | 1 | COMPARATIVE EXAMPLE |
| COMPARATIVE EXAMPLE 2 | 6 | A | 1 | MX3000 | 30.00 | 2.0 | — | 33.0 | 1 | COMPARATIVE EXAMPLE |
| EXAMPLE 5 | 7 | A | 1 | HYPRECICA TS | 15.13 | 0.2 | 1.71 | 17.0 | 1 | PRESENT INVENTION |
| EXAMPLE 6 | 8 | A | 1 | HYPRECICA TS | 15.13 | 0.5 | 1.71 | 17.0 | 1 | PRESENT INVENTION |
| EXAMPLE 7 | 9 | A | 1 | HYPRECICA TS | 15.13 | 2.0 | 1.71 | 17.0 | 1 | PRESENT INVENTION |
| EXAMPLE 8 | 10 | A | 1 | HYPRECICA TS | 15.13 | 9.0 | 1.71 | 17.0 | 1 | PRESENT INVENTION |
| COMPARATIVE EXAMPLE 3 | 11 | A | 1 | HYPRECICA TS | 15.13 | 0.0005 | 1.71 | 17.0 | 1 | COMPARATIVE EXAMPLE |
| COMPARATIVE EXAMPLE 4 | 12 | A | 1 | HYPRECICA TS | 15.13 | 12.0 | 1.71 | 17.0 | 1 | COMPARATIVE EXAMPLE |
| EXAMPLE 9 | 13 | A | 2 | HYPRECICA TS | 15.13 | 2.0 | 1.71 | 17.0 | 1 | PRESENT INVENTION |
| EXAMPLE 10 | 14 | A | 3 | HYPRECICA TS | 15.13 | 2.0 | 1.71 | 17.0 | 1 | PRESENT INVENTION |
| EXAMPLE 11 | 15 | A | 1 | HYPRECICA TS | 15.13 | 2.0 | 1.71 | 17.0 | 1 | PRESENT INVENTION |
| EXAMPLE 12 | 16 | B | 4 | HYPRECICA TS | 15.13 | 2.0 | 1.71 | 17.0 | 2 | PRESENT INVENTION |
| COMPARATIVE EXAMPLE 5 | 17 | A | 1 | — | — | 0.0 | — | 13.5 | 1 | COMPARATIVE EXAMPLE |
| COMPARATIVE EXAMPLE 6 | 18 | A | 2 | — | — | 0.0 | — | 13.5 | 1 | COMPARATIVE EXAMPLE |
| COMPARATIVE EXAMPLE 7 | 19 | A | 3 | — | — | 0.0 | — | 13.5 | 1 | COMPARATIVE EXAMPLE |
| COMPARATIVE EXAMPLE 8 | 20 | A | 1 | — | — | 0.0 | — | 3.0 | 1 | COMPARATIVE EXAMPLE |
| COMPARATIVE EXAMPLE 9 | 21 | A | 1 | — | — | 0.0 | — | 13.5 | 1 | COMPARATIVE EXAMPLE |

TABLE 2

| | HEAD CHIP END SURFACE | | | | EVALUATION | | | |
|---|---|---|---|---|---|---|---|---|
| | Rz (MV) (μm) | 0.95 × Rz (MV) (μm) | 2.0 × Rz (MV) (μm) | NOZZLE PLATE SUBSTRATE | VOID IN ADHESIVE LAYER | NON-EJECTION | INK EJECTION PROPERTIES | REMARKS |
| EXAMPLE 1 | 12.5 | 11.9 | 25 | SILICON | ○ | ○ | ○ | PRESENT INVENTION |
| EXAMPLE 2 | 12.5 | 11.9 | 25 | SILICON | ⊚ | ⊚ | ○ | PRESENT INVENTION |
| EXAMPLE 3 | 12.5 | 11.9 | 25 | SILICON | ⊚ | ○ | ○ | PRESENT INVENTION |
| EXAMPLE 4 | 15.0 | 14.3 | 30 | SILICON | ⊚ | ⊚ | ○ | PRESENT INVENTION |
| COMPARATIVE EXAMPLE 1 | 12.5 | 11.9 | 25 | SILICON | △ | △ | X | COMPARATIVE EXAMPLE |
| COMPARATIVE EXAMPLE 2 | 12.5 | 11.9 | 25 | SILICON | ○ | △ | X | COMPARATIVE EXAMPLE |
| EXAMPLE 5 | 12.5 | 11.9 | 25 | SILICON | ○ | ○ | ○ | PRESENT INVENTION |
| EXAMPLE 6 | 12.5 | 11.9 | 25 | SILICON | ○ | ○ | ○ | PRESENT INVENTION |
| EXAMPLE 7 | 12.5 | 11.9 | 25 | SILICON | ○ | ○ | ○ | PRESENT INVENTION |
| EXAMPLE 8 | 12.5 | 11.9 | 25 | SILICON | ○ | ○ | ○ | PRESENT INVENTION |
| COMPARATIVE EXAMPLE 3 | 12.5 | 11.9 | 25 | SILICON | △ | X | X | COMPARATIVE EXAMPLE |
| COMPARATIVE EXAMPLE 4 | 12.5 | 11.9 | 25 | SILICON | X | X | X | COMPARATIVE EXAMPLE |
| EXAMPLE 9 | 12.5 | 11.9 | 25 | SILICON | ○ | ⊚ | ○ | PRESENT INVENTION |
| EXAMPLE 10 | 12.5 | 11.9 | 25 | SILICON | ○ | ○ | ○ | PRESENT INVENTION |
| EXAMPLE 11 | 12.5 | 11.9 | 25 | POLYIMIDE | ○ | ○ | ○ | PRESENT INVENTION |
| EXAMPLE 12 | 15.0 | 14.3 | 30 | SILICON | ⊚ | ⊚ | ⊚ | PRESENT INVENTION |
| COMPARATIVE EXAMPLE 5 | 12.5 | 11.9 | 25 | SILICON | △ | X | X | COMPARATIVE EXAMPLE |
| COMPARATIVE EXAMPLE 6 | 12.5 | 11.9 | 25 | SILICON | △ | △ | X | COMPARATIVE EXAMPLE |
| COMPARATIVE EXAMPLE 7 | 12.5 | 11.9 | 25 | SILICON | ⊚ | X | X | COMPARATIVE EXAMPLE |
| COMPARATIVE EXAMPLE 8 | 12.5 | 11.9 | 25 | SILICON | X | X | X | COMPARATIVE EXAMPLE |
| COMPARATIVE EXAMPLE 9 | 12.5 | 11.9 | 25 | SILICON | △ | X | X | COMPARATIVE EXAMPLE |

It can be understood from Tables 1 and 2 that, in each inkjet head having the nozzle plate bonded thereto by using the adhesive containing the spherical particles according to the present invention, voids in the adhesive are hardly present, non-ejection due to inflow of the adhesive hardly occurs, and ink ejection properties are excellent.

In the present invention, Example 2 is superior to Example 11 in voids in the adhesive layer and non-ejection, and hence it can be understood that silicon is excellent as a base material of the nozzle plate. Furthermore, Example 12 using the adhesive that can be hardened by ultraviolet rays has the most excellent ink ejection properties.

EXPLANATIONS OF LETTERS OR NUMERALS

1 head chip
2 nozzle plate
3 wiring substrate
11 channel wall
12 ink channel
13 metal layer (electrode)
14 connection electrode
15 protective film
15' convex portion of protective film (abnormally grown portion)
16 adhesive
17 spherical particle
21 nozzle
32 opening portion
33 wiring electrode

The invention claimed is:

1. A method for producing an inkjet head that is produced by forming a film on a head chip having a channel member with an ink channel formed thereon and joining an end surface of the head chip coated with the film to a nozzle plate, the method comprising applying an adhesive containing spherical particles to at least one of the end surface of the head chip and a joint surface of the nozzle plate and then joining the nozzle plate, wherein a volume average particle diameter of the spherical particles is in the range of 0.95×Rz (MV) to 2.0×Rz (MV), and wherein the spherical particles are in the range of 0.1 volume % to 10.0 volume % in the adhesive, wherein Rz is one surface roughness index specified by JIS B0601:2001 and is a maximum height of the end surface of the head chip coated with the film when a reference length of a surface joined to the nozzle plate is 2.5 mm, and Rz (MV) is an average value of Rz obtained by measuring five positions, wherein a coefficient of variation of a particle diameter of each spherical particle is not greater than 1.8%, and wherein the film contains polyparaxylylene or a polyparaxylylene derivative.

2. The method for producing an inkjet head according to claim 1, wherein the film is formed by a vapor phase method.

3. The method for producing an inkjet head according to claim 1, wherein the film is a protective film.

4. The method for producing an inkjet head according to claim 1, wherein the adhesive is applied to the end surface of the head chip.

5. The method for producing an inkjet head according to claim 1, wherein the nozzle plate has a substrate made of silicon.

6. The method for producing an inkjet head according to claim 1, wherein the adhesive is an adhesive curable by ultraviolet rays.

7. The method for producing an inkjet head according to claim 1, wherein the nozzle plate has a plurality of nozzles.

8. The method for producing an inkjet head according to claim 1, wherein the average value Rz(MV) of the maximum height is not smaller than 5 μm and not greater than 25 μm.

9. The method for producing an inkjet head according to claim 1, wherein the film has a thickness of 1 μm or more and 10 μm or less.

10. The inkjet head according to claim 1, wherein the spherical particles have a volume average particle diameter of 3 μm to 60 μm.

11. The inkjet head according to claim 1, wherein the spherical particles have a volume average particle diameter of 4.75 μm to 50 μm.

12. An inkjet head in which a head chip having a channel member with an ink channel formed thereon is coated with a film and an end surface of the head chip coated with the film is joined to a nozzle plate through an adhesive, the adhesive containing spherical particles whose volume average particle diameter is in the range of 0.95×Rz (MV) to 2.0×Rz (MV), wherein the spherical particles are in the range of 0.1 volume % to 10.0 volume % in the adhesive, wherein Rz is one surface roughness index specified by JIS B0601:2001 and is a maximum height of the end surface of the head chip coated with the film when a reference length of a surface joined to the nozzle plate is 2.5 mm, and Rz (MV) is an average value of Rz obtained by measuring five positions, wherein a coefficient of variation of a particle diameter of the spherical particles is not greater than 1.8%, and wherein the film contains polyparaxylylene or a polyparaxylylene derivative.

13. The inkjet head according to claim 12, wherein the film is a protective film.

14. The inkjet head according to claim 12, wherein the nozzle plate has a substrate made of silicon.

15. The inkjet head according to claim 12, wherein the adhesive is an adhesive curable by ultraviolet rays.

16. The inkjet head according to claim 12, wherein the nozzle plate has a plurality of nozzles.

17. The inkjet head according to claim 12, wherein the average value Rz(MV) of the maximum height is not smaller than 5 μm and not greater than 25 μm.

18. The inkjet head according to claim 12, wherein the film has a thickness of 1 μm or more and 10 μm or less.

19. The inkjet head according to claim 12, wherein the spherical particles have a volume average particle diameter of 3 μm to 60 μm.

20. The inkjet head according to claim 12, wherein the spherical particles have a volume average particle diameter of 4.75 μm to 50 μm.

* * * * *